(12) United States Patent
Stoner

(10) Patent No.: US 7,880,325 B2
(45) Date of Patent: Feb. 1, 2011

(54) APPARATUS AND METHOD PERTAINING TO LIGHT-BASED POWER DISTRIBUTION IN A VEHICLE

(75) Inventor: Paul Douglas Stoner, Powell, OH (US)

(73) Assignee: Embedded Control Systems, Inc., Bolingbrook, IL (US)

( * ) Notice: Subject to any disclaimer, the term of this patent is extended or adjusted under 35 U.S.C. 154(b) by 0 days.

(21) Appl. No.: 12/430,437

(22) Filed: Apr. 27, 2009

(65) Prior Publication Data
US 2009/0230784 A1 Sep. 17, 2009

Related U.S. Application Data

(63) Continuation of application No. 11/549,887, filed on Oct. 16, 2006, now abandoned.

(51) Int. Cl.
*B60L 1/00* (2006.01)
(52) U.S. Cl. .................................................... 307/9.1
(58) Field of Classification Search ................... 307/9.1
See application file for complete search history.

(56) References Cited

U.S. PATENT DOCUMENTS

| | | | |
|---|---|---|---|
| 821,393 | A | 5/1906 | Wright et al. |
| 3,208,342 | A | 9/1965 | Nethercot |
| 3,606,522 | A | 9/1971 | Townes et al. |
| 3,999,074 | A | 12/1976 | Callaghan |
| 4,161,650 | A | 7/1979 | Caouette et al. |
| 4,350,867 | A | 9/1982 | Kinoshita et al. |
| 4,383,729 | A | 5/1983 | Suzuki et al. |
| 4,422,180 | A | 12/1983 | Wendt |
| 4,517,458 | A | 5/1985 | Barringer |
| 4,713,762 | A | 12/1987 | Igarashi |
| 4,875,041 | A | 10/1989 | Dannenberg |
| H000855 | H | 12/1990 | Otto et al. |
| 5,001,755 | A | 3/1991 | Skret |
| 5,012,087 | A | 4/1991 | Rockstroh et al. |
| 5,063,371 | A | 11/1991 | Oyer et al. |
| 5,099,144 | A * | 3/1992 | Sai .............................. 250/551 |
| 5,110,368 | A * | 5/1992 | Otto et al. ................... 136/246 |
| 5,255,880 | A | 10/1993 | Lyloc et al. |

(Continued)

FOREIGN PATENT DOCUMENTS

WO 2008022138 A2 2/2002

(Continued)

OTHER PUBLICATIONS

Related International Search Report for PCT/US2007/080965, May 7, 2008, 2 pages.

(Continued)

*Primary Examiner*—Robert L. DeBeradinis
(74) *Attorney, Agent, or Firm*—Fitch, Even, Tabin & Flannery

(57) ABSTRACT

A vehicle (400) such as an aircraft is provided (101) with a source of light (401). An optical conduit is then used to couple (104) this source of light to a light-to-electricity conversion apparatus (408). So configured, the optical conduit delivers light from this source of light to the light-to-electricity conversion apparatus such that the light source then serves as a source of electricity in the vehicle.

38 Claims, 2 Drawing Sheets

U.S. PATENT DOCUMENTS

| | | | |
|---|---|---|---|
| 5,308,986 | A | 5/1994 | Walker |
| 5,363,405 | A * | 11/1994 | Hormel ............... 375/219 |
| 5,432,497 | A | 7/1995 | Briski et al. |
| 5,533,188 | A | 7/1996 | Palumbo |
| 5,778,203 | A | 7/1998 | Birkedahl et al. |
| 5,780,856 | A | 7/1998 | Oka et al. |
| 5,783,993 | A | 7/1998 | Briski et al. |
| 5,791,756 | A | 8/1998 | Hulse et al. |
| 5,796,935 | A | 8/1998 | Morrison et al. |
| 5,801,373 | A | 9/1998 | Oozu et al. |
| 5,810,284 | A | 9/1998 | Hibbs et al. |
| 5,852,698 | A | 12/1998 | Bringuier |
| 5,936,318 | A | 8/1999 | Weiler et al. |
| 5,949,330 | A | 9/1999 | Hoffman et al. |
| 6,061,487 | A | 5/2000 | Toyama et al. |
| 6,133,846 | A | 10/2000 | Birkedahl et al. |
| 6,249,868 | B1 | 6/2001 | Sherman et al. |
| 6,356,809 | B1 | 3/2002 | Morrison et al. |
| 6,592,245 | B1 | 7/2003 | Tribelsky et al. |
| 6,651,106 | B1 | 11/2003 | Driscoll |
| 6,664,656 | B2 | 12/2003 | Bernier |
| 6,707,274 | B1 | 3/2004 | Karr |
| 6,792,323 | B2 | 9/2004 | Krzyzanowski et al. |
| 6,882,288 | B2 | 4/2005 | Weigl |
| 6,930,820 | B1 | 8/2005 | Shooks et al. |
| 7,055,995 | B1 | 6/2006 | Condon et al. |
| 7,072,588 | B2 * | 7/2006 | Skinner ............... 398/171 |
| 7,142,748 | B1 | 11/2006 | Yang |
| 7,149,658 | B2 | 12/2006 | Kadaba |
| 7,206,877 | B1 | 4/2007 | Doerenberg et al. |
| 7,272,845 | B2 | 9/2007 | Creamer et al. |
| 7,378,989 | B2 | 5/2008 | Wisch et al. |
| 7,482,950 | B2 | 1/2009 | Stoner et al. |
| 2002/0044316 | A1 | 4/2002 | Myers |
| 2002/0046365 | A1 | 4/2002 | Avizienis |
| 2003/0025958 | A1 | 2/2003 | Shino et al. |
| 2003/0072051 | A1 | 4/2003 | Myers et al. |
| 2003/0090777 | A1 | 5/2003 | Yap |
| 2004/0264982 | A1 | 12/2004 | Harres |
| 2005/0211835 | A1 | 9/2005 | Henley et al. |
| 2006/0043242 | A1 | 3/2006 | Benson |
| 2006/0106796 | A1 | 5/2006 | Venkataraman et al. |
| 2006/0133733 | A1 | 6/2006 | Koste et al. |
| 2006/0283931 | A1 | 12/2006 | Polli et al. |
| 2007/0260939 | A1 | 11/2007 | Kammann et al. |
| 2007/0288974 | A1 | 12/2007 | Creamer et al. |
| 2008/0013569 | A1 | 1/2008 | Boren |
| 2008/0087827 | A1 | 4/2008 | Stoner et al. |
| 2008/0088484 | A1 | 4/2008 | Stoner et al. |
| 2008/0089087 | A1 | 4/2008 | Stoner |
| 2008/0099607 | A1 | 5/2008 | Stoner |

FOREIGN PATENT DOCUMENTS

| | | |
|---|---|---|
| WO | 2004007044 A2 | 1/2004 |
| WO | 2008022134 A2 | 2/2008 |
| WO | 2008022144 A2 | 2/2008 |
| WO | 2008048826 A2 | 4/2008 |
| WO | 2008048830 A2 | 4/2008 |
| WO | 2008048833 A2 | 4/2008 |
| WO | 2008048838 A2 | 4/2008 |

OTHER PUBLICATIONS

Related International Search Report for PCT/US2007/080924, Apr. 25, 2008, 2 pages.

Related International Search Report for PCT/US2007/080902, Apr. 30, 2008, 2 pages.

Related International Search Report for PCT/US2007/080837, Sep. 4, 2008, 2 pages.

Related International Search Report for PCT/US2007/75923, Jul. 7, 2008, 2 pages.

Related International Search Report for PCT/US2007/075917, Apr. 2, 2008, 2 pages.

Related International Search Report for PCT/US2007/075910, Sep. 17, 2008, 4 pages.

Stojcev et al., "A Hardware Mid-Value Select Voter Architecture," Elsevier Sciences, Ltd. Feb. 2001, Microelectronics Journal, vol. 32, Issue 2, pp. 149-162.

Chau et al., "Design of a Fault-Tolerant COTS-Based Bus Architecture," IEEE Dec. 1999, IEEE Transactions on Reliability, vol. 48, No. 4, pp. 351-359.

Tang et al., "Minimal Cut Set/Sequence Generation for Dynamic Fault Trees," IEEE RAMS 2004, pp. 207-213.

Kristic et al., "A Mid-Value Select Voter," Elsevier Science, Ltd. Mar.-Apr. 2005, Microelectronics Reliability, vol. 45, Issues 3-4, pp. 733-738.

Malekpour, M., "Fly-By-Light-By-Wire Fault-Tolerant Fiber-Optic Backplane" Langley Research Center, Apr. 2002 [retrieved Jan. 5, 2008 from http://ntrs.nasa.gov/archive/nasa/casi.ntrs.nasa.gov/20020044097_2002076988.pdf].

Otto et al.; "Optical Beam Switching Circuit for Photovoltaic Energy Conversion;" U.S. Statutory Invention Registration No. H855, published Dec. 4, 1990; 5 pages.

* cited by examiner

APPARATUS AND METHOD PERTAINING TO LIGHT-BASED POWER DISTRIBUTION IN A VEHICLE

RELATED APPLICATIONS

This application is a continuation of U.S. patent application Ser. No. 11/549,887 entitled APPARATUS AND METHOD PERTAINING TO LIGHT-BASED POWER DISTRIBUTION IN A VEHICLE and filed on Oct. 16, 2006.

This invention relates generally to three previously filed patent applications and to three additional patent applications as were filed on even date herewith as follows (wherein the contents of each of these applications is fully incorporated herein by this reference):

U.S. patent application Ser. No. 11/464,291, filed Aug. 14, 2006;

U.S. patent application Ser. No. 11/464,308, filed Aug. 14, 2006;

U.S. patent application Ser. No. 11/464,321, filed Aug. 14, 2006;

U.S. patent application Ser. No. 11/549,891 filed Oct. 16, 2006, entitled Apparatus and Method Pertaining to Light-Based Power Distribution in a Vehicle;

U.S. patent application Ser. No. 11/549,899 filed Oct. 16, 2006, entitled Apparatus and Method Pertaining to Provision of a Substantially Unique Aircraft Identifier Via a Source of Power; and U.S. patent application Ser. No. 11/549,904 filed Oct. 16, 2006, entitled Apparatus and Method Pertaining To Light-Based Power Distribution in a Vehicle.

TECHNICAL FIELD

This invention relates generally to light and the use thereof in a vehicular context.

BACKGROUND

Vehicles of various kinds, including terrestrial, marine, and flying vehicles are well known in the art. Such vehicles are typically, and increasingly, equipped with a wide variety of electrically powered vehicular components. Such components can and do serve a wide range of purposes that range from mission-critical to mere convenience or comfort. Such electrically powered vehicular components, in turn, require a source of electric power.

Being mobile, a vehicle must typically carry its own onboard power source. In many cases this comprises one or more batteries that may, or may not, themselves be charged by a mechanical power plant (such as an internal combustion engine or the like) that exclusively serves such a purpose or that serves other purposes as well (such as providing motive force for the vehicle). This, in turn, requires the use of electrical conductors to couple the power source to the electrically powered vehicular components.

When the number of electrically powered vehicular components is relatively small, the distance separating such components from the power source relatively short, and weight comprises a negligible design concern, such prior art approaches can be relatively successful. In other application settings, however, numerous disadvantages present themselves. A modern aircraft, for example, provides a number of salient examples in this regard.

For example, a modern aircraft typically has a relatively large number of electrically powered vehicular components (many of which are important or critical to the safe operation of the aircraft). These numerous components are often widely distributed over the extent and girth of the aircraft. As a result, a significant quantity of electrically conductive material (such as copper wire) must be installed to couple these components to the aircraft's power source. This approach lends considerable additional weight to the aircraft. As the carrying-capacity of any aircraft is ultimately limited, such weight is always unhappily assumed at the expense of passenger or cargo bearing capacity, fuel carrying capacity, or the like.

BRIEF DESCRIPTION OF THE DRAWINGS

The above needs are at least partially met through provision of the apparatus and method pertaining to light-based power distribution in a vehicle described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a vehicle such as an aircraft is provided with a source of light. An optical conduit is then used to couple this source of light to a light-to-electricity conversion apparatus. So configured, the optical conduit delivers light from this source of light to the light-to-electricity conversion apparatus such that the light source then serves as a source of electricity in the vehicle.

By one approach, each of the vehicle's electrically powered vehicular components are provided with such a light-to-electricity conversion apparatus. If desired, a rechargeable power supply, such as a battery, receives at least part of the electrical power output of the light-to-electricity conversion apparatus. So configured, the electrically powered vehicular component will continue to operate in a normal manner (via power supplied by this rechargeable power supply) even when the optical conduit or the source of light are compromised in some manner. Though the rechargeable power supply of course represents an ultimately exhaustible reserve in this regard, a properly sized rechargeable power supply will ensure an adequate power reserve to permit safe operation and handling of the vehicle during, for example, a given trip.

Such an approach can lead to dramatic reductions with respect to the weight of the vehicle. Generally speaking, available optical conduit materials (and their corresponding couplers) weigh much less than corresponding electrically conductive materials (and their corresponding couplers). These teachings also yield an overall power distribution architecture that can provide improved protection against catastrophic single-point-of-failure events.

Figure 1:
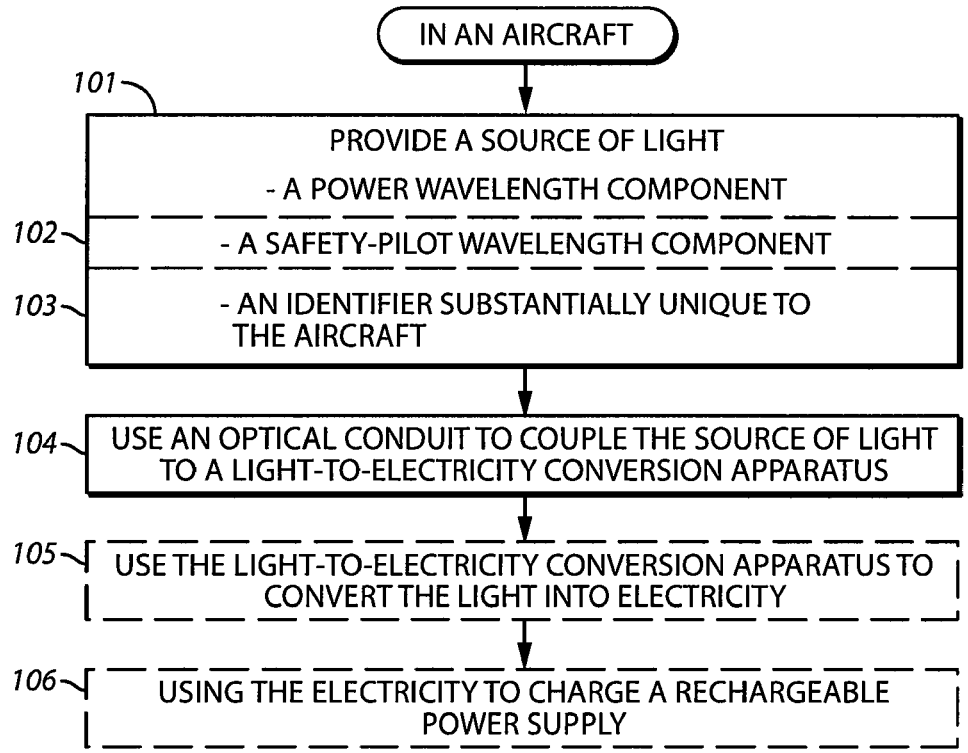
FIG. 1 comprises a flow diagram as configured in accordance with various embodiments of the invention.

These and other benefits may become clearer upon making a thorough review and study of the following detailed description. Referring now to the drawings, and in particular to FIG. 1, a process 100 illustrative of these teachings will first be presented. These teachings are generally applicable in a wide variety of settings including both mobile and non-moving applications. For the sake of example this process 100 will be presented in conjunction with an aircraft application setting. Those skilled in the art will understand that this example is intended only as a illustrative case and is not to be taken as a suggestion that these teachings are limited in this regard.

This process 100 provides for provision 101 of a source of light. By one approach, this source of light comprises, at least in part, a power wavelength component. As will be described below, this power wavelength component will serve to excite a corresponding light-to-electricity conversion apparatus. Such a power wavelength component can therefore comprise, for example, light having a wavelength (or a range of wavelengths) that is particularly stimulative for certain photonically-responsive materials.

In this regard, at present, certain non-visible or substantially non-visible wavelengths of light are particularly appropriate for such service. Existing materials of value as known in the art, for example, are particularly efficient when excited by light having a wavelength of about 808 nanometers (which lies in the infrared range). If desired, however, visible light (such as white light having a wavelength in the range of 450 to 700 nanometers) can be used with at least some photonically-based converters.

Those skilled in the art will also recognize that these teachings will be equally applicable to light having other wavelengths (such as ultraviolet, far infrared, or the like) as materials are developed and introduced that are photonically-excitable at those other wavelengths. It will also be understood by those skilled in the art that this source of light can itself comprise a source of a plurality of different wavelengths where each of the wavelengths can be intended and applied as a power component.

This source of light can be self-powered (using, for example, a dedicated power source such as a battery, alternator, or the like) or can rely, in whole or in part, upon another power source. For example, by one approach, this source of light can rely upon power from an aircraft engine. In such a case, for example, the aircraft engine may serve to power an alternator that provides corresponding electricity to the source of light. As another example, the aircraft engine may serve to power a charging apparatus that in turn maintains a charge on a battery that provides necessary power to the source of light. Such approaches are generally well understood in the art and require no further elaboration here.

Non-visible (or substantially non-visible) light, particularly when employed as a power component, can potentially present a concern for service personnel or the like. In particular, being non-visible (or substantially non-visible), such light will not necessarily invoke an automatic iris response in the eye of a beholder that would cause the iris to at least partially close. In some cases, however, this power component light may nevertheless be capable of causing at least temporary eye-related distress. Therefore, if desired, this process 100 will optionally accommodate also providing a safety-pilot wavelength component 102 in addition to the aforementioned power wavelength component.

By one approach, this safety-pilot wavelength component 102 can comprise a visible light component. Being visible, this component can serve to invoke an iris response and/or a useful perception or reaction on the part of an observer. This, in turn, can aid in preventing the occurrence of any problems as might otherwise occur when gazing too long at the power wavelength component provided by the source of light.

Any of a variety of colors can be considered for application in this regard. For example, a red or yellow color might be employed as such colors are often associated with a dangerous or cautionary situation in many cultures. As another example, a green colored light (having, for example, a wavelength of about 532 nanometers) could serve in this regard. Green light sources (such as green laser diodes) are relatively inexpensive and have the further benefit of being perceived by the average human as being brighter than other colors of similar objective brightness.

In general, this safety-pilot wavelength component can comprise a constant component of the source of light. If desired, however, the brightness of this component can be periodically varied (and/or the safety-pilot component can be switched on and off at regular or semi-regular intervals) in order to provide a pulsed safety-pilot wavelength component. This pulsed representation may be useful in some application settings to serve as a human-perceptible alarm or cautionary signal of sorts. It would also be possible to switch between different colors of visible light (such as between green and red) to provide a visual warning to alert an onlooker that they should not continue to gaze into the source of light.

This process 100 will also optionally accommodate providing an identifier 103 that is substantially unique to the application setting. When that application setting comprises an aircraft, for example, this identifier can comprise a unique numeric or alphanumeric string that is assigned to only one given aircraft (by, for example, a given manufacturer, a given aircraft operator, a given regulatory agency, a given industry group, or the like). Such an indicator can be modulated onto a wavelength carrier that serves only to bear this information or may, if desired, be modulated onto the aforementioned power wavelength component and/or the safety-pilot wavelength component. The use and application of such an identifier in this context will be further discussed in the following description.

This process 100 then provides for using 104 an optical conduit to couple this source of light to a light-to-electricity conversion apparatus. The light-to-electricity conversion apparatus can comprise any known or hereafter developed material and/or platform that serves to convert impinging light into electricity. Such information comprises a well-understood area of endeavor. Accordingly, for the sake of brevity and clarity, this description will not provide further needless elaboration in this regard.

The optical conduit itself can comprise any of a wide variety of materials and form factors. By one approach, hard-form glass or plastic waveguides of various kinds could be employed for this purpose. For many application settings, however, optical fibers will serve as a useful mechanism in this regard. Optical fibers of a variety of materials can serve for this purpose. When weight-savings and cost represent important design considerations, however, as with an aircraft application setting, optical fibers comprised of polymer materials (such as plastic) may be particularly appropriate. Such optical fibers are well known in the art and require no further description here.

Particularly in consideration of the power wavelength component to be conveyed, these optical fibers can be of relatively large diameter. In typical prior art applications, very small diameter fibers are used to send the light in such regards, (for example, 50 um or 62.5 um Single-Mode glass fibers). In the present teachings, however, optical fibers having a diameter from about 0.1 to about 5 millimeters will work well for these purposes (with optical fibers having a diameter of about 1 millimeter being quite useful, for example, in a number of application settings). Such relatively wide dimensions have a particular benefit in that they have thousands of times the cross-sectional area of small diameter fibers. This, in turn, results in a relatively low power density, that is, total power per unit area of cross-sectional fiber core, and hence individually pose a relatively reduced risk of injury to the eye of a beholder. It also reduces greatly, and in some cases completely eliminates, the risk of an open fiber tip acting as an ignition source for fuel vapors, carpet or other fabric, or anything else that is flammable inside a vehicle.

Figure 2:
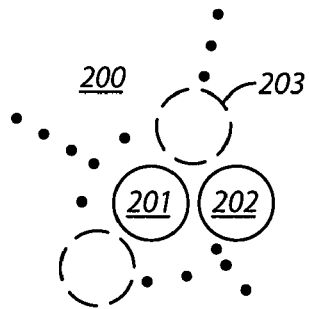
FIG. 2 comprises a schematic side elevational view as configured in accordance with various embodiments of the invention.

If desired, this optical conduit can comprise a plurality of optical fibers. To illustrate, and referring momentarily to FIG. 2, a given optical fiber 200 can comprise at least two optical fibers 201 and 202 (which may be of equal, or differing, sized diameters). As suggested by the optical fiber(s) 203 that are shown with phantom lines as well as the ellipsis', an additional number of optical fibers can be provided as desired. For example, for many application settings, such an optical conduit 200 can be comprised of from about 2 to about 100 such optical fibers.

So configured (and returning again to FIG. 1), this process 100 provides for light (and particularly light having a power wavelength component) to be transported via an optical conduit to a light-to-electricity conversion apparatus. This, in turn, permits power to be distributed throughout an application setting (such as an aircraft) without requiring a concurrent distribution of costly, weighty electrical conductors.

As shown, this process 100 will also optionally accommodate using 105 this light-to-electricity conversion apparatus to convert such light into electricity and to use 106 this electricity to, in turn, charge a rechargeable power supply. The latter can then comprise the primary source of electricity for one or more corresponding electrically powered components.

Figure 3:
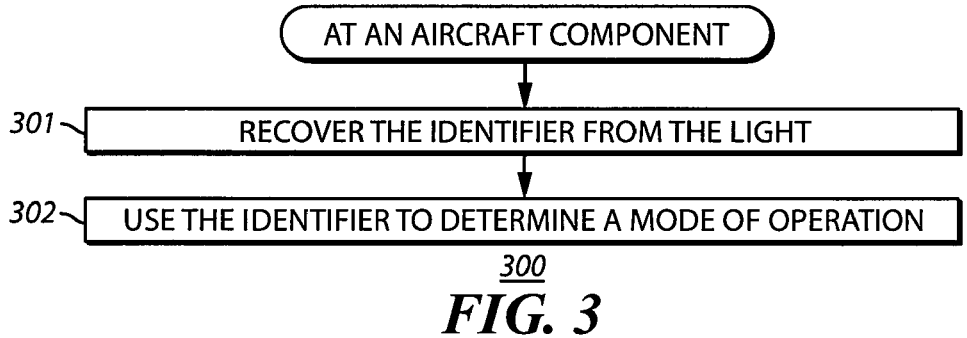
FIG. 3 comprises a flow diagram as configured in accordance with various embodiments of the invention.

So configured, and referring now to FIG. 3, these teachings will also optionally accommodate a process 300 whereby the aforementioned identifier is recovered 301 from the light and then used 302 to determine a particular mode of operation. This recovery can be accomplished using, for example, known photosensitive detectors/receivers that are capable of detecting and demodulating the identifier content from the light-based carrier(s).

As a more specific example in this regard, a given aircraft can have a corresponding unique identifier previously assigned thereto. Given aircraft components can, in turn, be pre-programmed for installation and operation in a given aircraft by installing that unique identifier in the aircraft component (for example, by storing that unique identifier in an accessible memory). So configured, such an aircraft component, upon recovering the unique identifier provided via light as described above, can then compare that recovered value with its previously assigned value to determine, for example, whether it has authorization to operate in this particular aircraft. Upon concluding that such is not the case, such an aircraft component could then automatically respond by at least partially diminishing one or more of its operating capabilities.

Such a capability could serve to deter willful or negligent maintenance personnel from installing inappropriate equipment when conducting routine or emergency maintenance services. For example, such functionality would discourage service personnel from inappropriately removing a given component from one aircraft and installing that component in another aircraft without appropriate authorization.

The specifics of this option can of course be varied to suit the needs and/or opportunities presented by a given application setting. As one example in this regard, if desired, a given aircraft component might be preauthorized to accept a particular range of identifiers. By this approach, a given component might be preauthorized for installation and use in, say, five specific aircraft in a given fleet while still discouraging such installations and use in remaining vehicles within that fleet. Such a range of identifiers could be identified as a table or list of authorized identifiers or, if desired, as a range of identifiers bounded by lower and upper identifier values.

Figure 4:
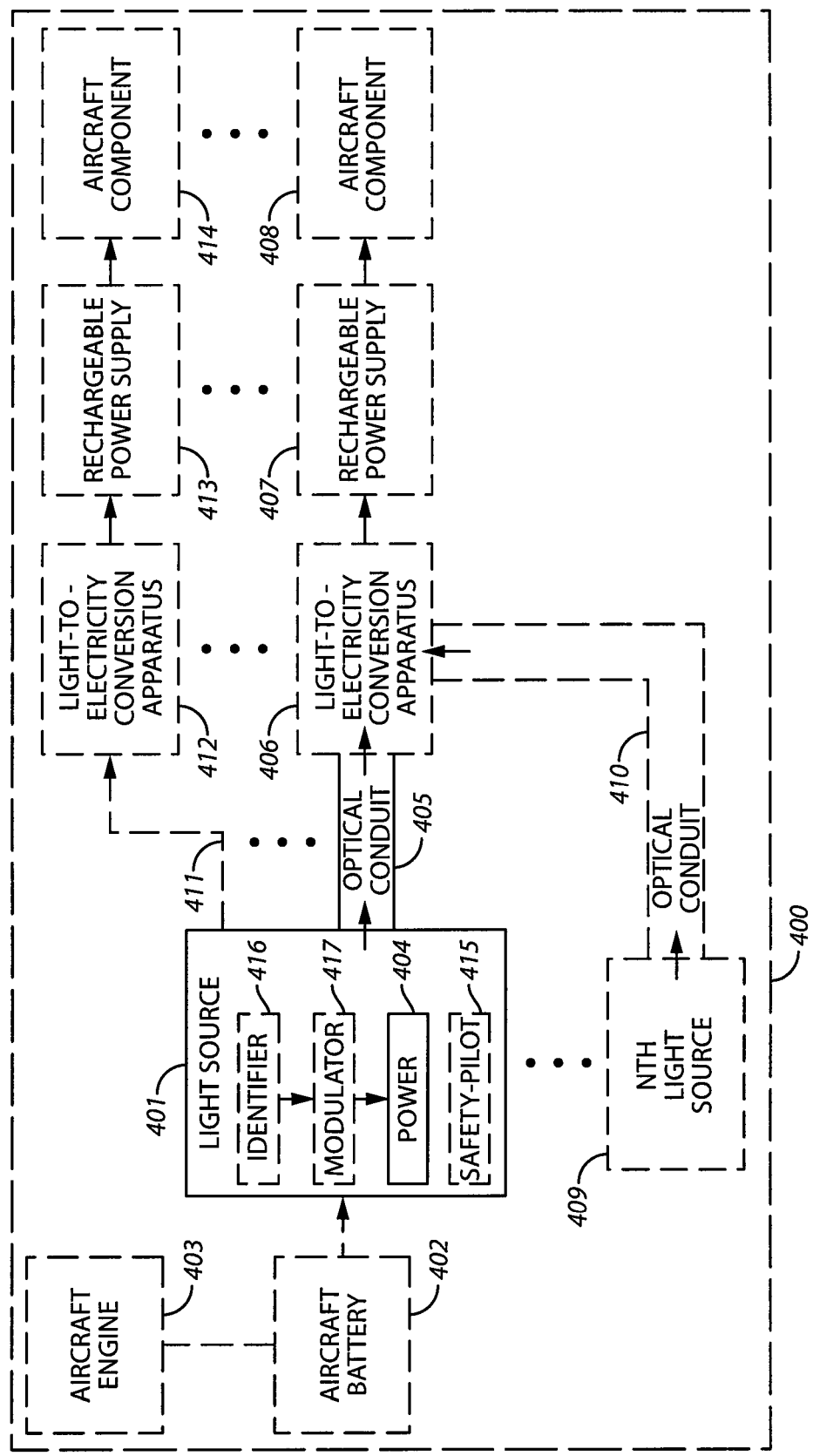
FIG. 4 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 4, an illustrative approach to such a platform will now be provided.

In this example the operative apparatus comprises a vehicle. In particular, and again for the purpose of illustration, this operative apparatus comprises an aircraft 400 (such as, but not limited to, a single or multi-engine fixed wing aircraft as are well known and understood in the art). If desired, this aircraft can be configured and arranged to optically distribute data to and from a variety of electrically powered aircraft components. Such optical data distribution can be achieved, for example, by use of the teachings contained in the above-reference patent applications. If desired, this aircraft can be further configured and arranged in this regard to optically distribute data to and from the electrically powered aircraft components independent of the power distribution optical conduit discussed above and described below.

In accordance with the teachings set forth herein, this aircraft 400 includes a source of power that comprises, in this example, a source of light 401. This source of light 401 can operably couple, if desired, to an aircraft battery 402 (such as an aircraft main battery) which may, in turn, be operably coupled to an aircraft engine 403 that serves to maintain a charge on the aircraft battery 402. Such engines, batteries, and the like are well known in the art. As the present teachings are not overly sensitive to any particular selections in this regard, for the sake of brevity further details regarding such components will not be provided here.

This source of light 401 comprises, in this embodiment, at least a power wavelength component source 404 (such as, but not limited to, any of a number of solid-state light emitting devices such as light emitting diodes, lasers, or the like). This source of light 401 operably couples via an optical conduit 405 (for example, as described above) to a light-to-electricity conversion apparatus 406 of choice. As noted above, this light-to-electricity conversion apparatus 406 serves to convert at least the power wavelength component (or components) as sourced by the source of light 401 into electricity. By one approach, and as suggested by the illustration, this light-to-electricity conversion apparatus 406 can optionally operably couple to a rechargeable power supply 407. So configured and arranged, electricity as provided by the light-toelectricity conversion apparatus 406 can serve to charge the rechargeable power supply 407.

The rechargeable power supply 407 can then couple, in turn, to a corresponding aircraft component 408. Virtually any electrically powered aircraft component can be served in this manner with some examples comprising avionics components, electro-servo mechanisms, displays, and so forth. This can comprise, if desired, a one-to-one configuration such that a single such rechargeable power supply serves to power only a single corresponding aircraft component. In the alternative, if desired, a single rechargeable power supply can serve to power a plurality of aircraft components. It would also be possible, if desired, to couple a plurality of rechargeable power supplies in parallel to a single aircraft component (in order to provide, for example, a redundant supply capacity).

If desired, these teachings will accommodate providing more than one such independent light source (as represented in the illustration by an Nth light source 409 (where "N" will be understood to comprise an integer value greater than one). By one approach, and as suggested by the illustration, two or more such sources of light can feed one or more of the same light-to-electricity conversion apparatuses. So configured, the light-to-electricity conversion apparatus has the benefit of redundant power sources and/or has a greater amount of instantaneous power available in the form of additional light. It would also be possible to use such additional light sources to power additional aircraft components independent of one another. To illustrate, a first light source could serve to power a first group of five aircraft components and a second light source could serve to power a second group of five other aircraft components.

If desired, and again as suggested in the illustration, one can also optionally couple more than one optical conduit to a given source of light (as suggested by the optical conduit denoted by reference numeral 411). Such additional optical conduits 411 can couple in a similar manner to other light-to-electricity conversion apparatuses 412, corresponding rechargeable power supplies 413, and aircraft components 414 as appropriate. So configured, those skilled in the art will recognize the resultant power distribution architecture as comprising a star distribution pattern. With such a configuration, severing of any one of the optical conduits will not have any effect upon the operability of the remaining optical conduits. It would also be possible for separate whole sets of light sources and sinks (i.e., in this illustrative embodiments, the light-to-electricity converter apparatuses) to be cross-coupled for fail-functional operation.

By one approach, the above-described rechargeable power supplies are each located relatively close to their corresponding aircraft component. In fact, if desired, such a capability can comprise a native capability of the aircraft component when the rechargeable power supply comprises an integral part of the aircraft component. This same approach can be taken with the light-to-electricity conversion apparatus as well, if desired.

It is not necessary that the source of light (either alone or in the aggregate with other sources of light) be capable of providing an instantaneous amount of energy that is capable of powering, in real time, all of the electrically powered aircraft components as may be coupled thereto. A properly sized rechargeable power supply should ensure that sufficient energy is available to operate such components for the duration of a given desired or planned operating period (such as a given flight of the aircraft).

As noted above, the source of light 401 can also serve to provide and combine a safety-pilot wavelength component 415 with the power wavelength component 404. So configured, and particularly when the power wavelength component 404 comprises a substantially or fully non-visible wavelength (such as an infrared wavelength) as described above, this safety-pilot wavelength component 415 (which can comprise a visible light of choice) can serve to warning onlookers to avoid looking into the light output by the source of light 401 while also serving to invoke a reflexive closure of the pupil in order to afford some degree of natural eye protection as well.

Also as noted above, the source of light 401 can be provided with an identifier (that may be stored, for example, in a corresponding memory 416) that is unique, or substantially unique, to the aircraft 400 itself. This identifier can be provided, for example, to a modulator 417 that modulates a light carrier (such as, but not limited to, the power wavelength component 404, the safety-pilot wavelength component 415, or another light carrier of choice) with the identifier information. Various modulators and types of modulation are known in the art and may be applied here as appropriate. The effective data rate can comprise, if desired, a relatively low data rate. It will also be understood that such information can be transmitted on a substantially continuous, repeated basis or can be transmitted less frequently as desired.

Those skilled in the art will recognize and understand that such an apparatus 400 may be comprised of a plurality of physically distinct elements as is suggested by the illustration shown in FIG. 4. It is also possible, however, to view this illustration as comprising a logical view, in which case one or more of these elements can be enabled and realized via a shared platform. It will also be understood that such a shared platform may comprise a wholly or at least partially programmable platform as are known in the art.

So configured, those skilled in the art will recognize and appreciate that these teachings provide a highly leveragable basis for distributing power throughout an application setting of choice. These teachings are readily implemented in an economically feasible manner and can easily scale to accommodate a wide range of needs and requirements. It will further be appreciated that these teachings can lead to significant weight reductions as electrical conductors and their corresponding couplers are removed as a design requirement. These teachings also serve to permit a relatively safe use of light as power source, in part through selection of appropriately sized optical fibers and in part through use of a safety-pilot wavelength component. Those skilled in the art will also recognize the value of providing a unique identifier in conjunction with the delivery of light throughout an application setting.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As but one illustration in this regard, if desired, the aforementioned source of light can be further configured and arranged to source yet another component of light. This additional component of light might comprise, for example, a data-bearing component (to facilitate the transmission and/or reception of operating information by the above-mentioned components), a heating component (such as infrared light in the range of about 1,000 to about 5,000 nanometers) that can be used as a heating source (for example, to warm unduly cooled avionics equipment, cockpit displays, and so forth), or even a surface illumination end use component (as when the additional component comprises white light that serves as backlight illumination for a cockpit display).

I claim:

1. A method comprising:
   in an aircraft:
   providing a source of light within the aircraft such that the source of light will accompany the aircraft when the aircraft is in flight;
   using an optical conduit to couple the source of light to a light-to-electricity conversion apparatus;
   such that light from the source of light is delivered to the light-to-electricity conversion apparatus via the optical conduit and is used to provide a source of electricity in the aircraft to components of the aircraft.

2. The method of claim 1 wherein providing a source of light comprises providing a source of light that is powered, at least in part, by an aircraft engine.

3. The method of claim 1 wherein providing a source of light comprises providing at least two independent sources of light.

4. The method of claim 3 wherein using an optical conduit to couple the source of light to a light-to-electricity conversion apparatus comprises:
   using a first optical conduit to couple a first source of light to the light-to-electricity conversion apparatus;
   using a second optical conduit that is independent of the first optical conduit to couple a second source of light that is different than the first source of light to the light-to-electricity conversion apparatus;
   such that the light-to-electricity conversion apparatus receives a redundant supply of light to be converted to electricity.

5. The method of claim 1 wherein providing a source of light comprises, at least in part, providing a source of infrared light.

6. The method of claim 1 wherein the light-to-electricity conversion apparatus comprises an infrared light-to-electricity conversion apparatus.

7. The method of claim 1 wherein the optical conduit comprises, at least in part, an optical fiber.

8. The method of claim 7 wherein the optical conduit comprises, at least in part, a plurality of the optical fibers.

9. The method of claim 8 wherein the plurality of the optical fibers comprises a plurality of optical fibers that are each comprised of polymer materials.

10. The method of claim 9 wherein the plurality of optical fibers comprises a plurality of optical fibers that are each about 0.1 to 5 millimeter in diameter.

11. The method of claim 10 wherein the plurality of optical fibers comprises from about 2 to about 100 optical fibers.

12. The method of claim 1 wherein using an optical conduit to couple the source of light to a light-to-electricity conversion apparatus comprises using a plurality of optical conduits to couple the source of light to a corresponding plurality of light-to-electricity conversion apparatuses.

13. The method of claim 12 wherein using a plurality of optical conduits to couple the source of light to a corresponding plurality of light-to-electricity conversion apparatuses comprises using a star-based architecture to couple the source of light to the plurality of light-to-electricity conversion apparatuses.

14. The method of claim 13 wherein separate whole sets of light sources and sinks are cross-coupled for fail-functional operation.

15. The method of claim 1 wherein the light-to-electricity conversion apparatus is further operably coupled to at least one electrically powered aircraft component.

16. The method of claim 15 wherein the light-to-electricity conversion apparatus comprises an integral part of the electrically powered aircraft component.

17. The method of claim 15 wherein the aircraft is configured and arranged to optically distribute data to and from the electrically powered aircraft component.

18. The method of claim 17 wherein the aircraft is configured and arranged to optically distribute data to and from the electrically powered aircraft component independent of the optical conduit.

19. The method of claim 1 wherein providing a source of light comprises:
   providing a source of a first component of the light;
   providing a source of a second component of the light, wherein the first and second components are different from one another.

20. The method of claim 19 wherein the first component of the light comprises a power component and the second component of the light comprises a visible marker.

21. The method of claim 20 wherein the power component comprises an infrared light component.

22. The method of claim 21 wherein the visible marker comprises a visible light component.

23. The method of claim 22 wherein the visible light component comprises a white light component.

24. The method of claim 20 wherein providing a source of light further comprises providing at least a third component of the light that is different from the first and second components, wherein the third component comprises at least one of:
   a data-bearing component;
   a heating component;
   a surface illumination end use component.

25. An aircraft power distribution system comprising:
   a source of light disposed within an aircraft such that the source of light will accompany the aircraft when the aircraft is in flight;
   an optical conduit that is operably coupled between the source of light and a light-to-electricity conversion apparatus;
   such that light from the source of light is delivered to the light-to-electricity conversion apparatus via the optical conduit and is used to provide a source of electricity in the aircraft.

26. The aircraft power distribution system of claim 25 wherein the source of light is operably coupled to an aircraft engine to thereby facilitate powering the source of light.

27. The aircraft power distribution system of claim 25 wherein the source of light is operably coupled to an aircraft main battery to thereby facilitate powering the source of light.

28. The aircraft power distribution system of claim 25 wherein the source of light comprises at least two independent sources of light.

29. The aircraft power distribution system of claim 28 wherein the optical conduit comprises:
   a first optical conduit that is operably coupled between a first source of light and the light-to-electricity conversion apparatus;
   a second optical conduit that is independent of the first optical conduit and that is operably coupled between a second source of light and the light-to-electricity conversion apparatus, wherein the second source of light is different from the first source of light;
   such that the light-to-electricity conversion apparatus receives a redundant supply of light to be converted to electricity.

30. The aircraft power distribution system of claim 25 wherein the source of light comprises, at least in part, a source of infrared light.

31. The aircraft power distribution system of claim 25 wherein the optical conduit comprises, at least in part, an optical fiber.

32. The aircraft power distribution system of claim 31 wherein the optical conduit comprises, at least in part, a plurality of the optical fibers.

33. The aircraft power distribution system of claim 32 wherein the plurality of the optical fibers comprises a plurality of optical fibers that are each comprised of a polymer material.

34. The aircraft power distribution system of claim 33 wherein the plurality of optical fibers comprises a plurality of optical fibers that are each about 0.1 to 5 millimeter in diameter.

35. The aircraft power distribution system of claim 34 wherein the plurality of optical fibers comprises from about 2 to about 100 optical fibers.

36. The aircraft power distribution system of claim 25 wherein the optical conduit that is operably coupled between the source of light and a light-to-electricity conversion apparatus comprises a plurality of optical conduits that are each operably coupled between the source of light and a corresponding plurality of light-to-electricity conversion apparatuses.

37. The aircraft power distribution system of claim 36 wherein the plurality of optical conduits that are each operably coupled between the source of light and a corresponding plurality of light-to-electricity conversion apparatuses are so coupled using a star-based architecture.

38. An aircraft comprising:
a plurality of electrically powered aircraft components;
a source of light;
a plurality of optical conduits, wherein at least one of the plurality of optical conduits is operably coupled between the source of light and a corresponding light-to-electricity conversion apparatus that is operably coupled to at least one of the plurality of electrically powered aircraft components;
such that light from the source of light is delivered to the light-to-electricity conversion apparatus via the optical conduit and is used to provide a source of electricity to the plurality of electrically powered aircraft components.

* * * * *